United States Patent Office 3,196,126
Patented July 20, 1965

3,196,126
SYNTHETIC RUBBER
Wilbur J. Wald, Pittsburgh, Pa., assignor to Neville Chemical Company, Pittsburgh, Pa., a corporation of Pennsylvania
No Drawing. Original application Mar. 4, 1960, Ser. No. 12,701. Divided and this application July 24, 1961, Ser. No. 125,930
16 Claims. (Cl. 260—33.6)

This application is a division of my copending application Serial No. 12,701, filed March 4, 1960.

This invention relates to improved compounds and methods for producing improved compounded elastomeric compositions based on oil-extended diene homopolymers of, for example, butadiene, isoprene, chloroprene, etc., and copolymers of these with styrene and its homologues.

Of late years the use of certain hydrocarbon oils in the higher than previously used molecular weight SBR polymers, i.e., butadiene-styrene copolymer rubber, has produced an advantageous raw material for the rubber industry. The introduction of the cold (41° F. polymerized) SBR with its higher molecular weight and greater abrasion resistance was in itself an advance of recognized importance in the development of the industry. The development of latex blending and subsequent coagulation of the cold SBR latex and emulsified extender-oils was an equally important advance in that it extended existing plant capacity at little or no added cost, produced a product of lower vulcanized hardness and modulus, while at the same time the effect on ultimate tensile strength was slight. The method lowered the cost of the compounded rubber appreciably. The good abrasion resistance, lower heat build-up, and quieter and smoother ride found in tire operation as a result of the lower compounded hardness were further plus values.

As the degree of oil extension increased from 25 through 37.5 to 50 phr. (parts per hundred of rubber hydrocarbon) problems of splice and ply adhesion, both green and cured, and of oil bleeding or migration into the natural rubber tire cushion and natural rubber coated tire cords resulted in somewhat more rapid deterioration of the natural rubber compound. As a consequence there was a tendency toward weakening and separation of the plies in the tire with ultimate premature tire failure.

Such bleeding tendencies show even to a greater extent in those rubber compounds containing mineral and other fillers having relatively low oil absorbing properties, and in those compounds which have been cured or vulcanized to a higher degree than usual. Heat aging of any compound based on oil-extended SBR will intensify whatever bleeding tendencies it may have. For the production of commercial products of safe utilization and reliable quality at an economical level, this bleeding tendency must be controlled. If the bleeding can be controlled, and at the same time the final cost of the rubber product further lowered the full advantages of these modern developments can be realized.

The present invention is based on the discovery that far superior compound stability from the point of view of bleeding or migration of oil, or oil and other components, can be imparted to the compound through the addition of certain relatively low molecular weight hydrocarbon resins. At the same time the addition of such resins aid in the dispersion of the fillers, pigments and reinforcing agents during the rubber compounding step particularly when a Banbury, rubber mill, or other mechanical means is used, and further aids in bringing out the maximum physical properties to be obtained from a given loading of filler.

As will be shown later, not all hydrocarbon resins of the same relatively low molecular weight will accomplish this result. In fact, the addition of some has been found to intensify the undesirable bleeding tendencies at a given proportion of oil to rubber hydrocarbons. Proper selection of the resin used can also aid in adjusting the hardness of the final compound to some degree.

As the amount of suitable resin is increased in a rubber compound the oil bleeding tendency becomes less and any plasticizing action in excess of that desired can often be used to an economic advantage by further increasing proportions of filler and other components. For some compounds it may be found desirable to use as high as 100 or more parts of resin per hundred of rubber. This, of course, would be accompanied by a corresponding adjustment in curing agents, increase in filler loading, and resulting lower compound cost. Such high resin loadings may also encourage further oil-extension of the present high molecular weight butadiene-styrene copolymers, as well as the development and use of even higher molecular weight butadiene-styrene copolymers, without encountering or aggravating bleeding difficulties. It was not so long ago that the use of even 25 phr. of extending oil in a tire compound would have been judged fantastic. Now 50 phr. of oil-extension in SBR polymer is being introduced commercially. The use of the resins of this invention make further oil-extension above the present 50 phr. practical.

Resin loadings of 100 and even higher parts per hundred parts of high oil-extended butadiene-styrene elastomer would be the most practical in mechanical goods such as floor mats, floor tile, stair treads, etc., where the advantage of increased amounts of hardening filler can be used at an appreciable economic savings.

In the following text the butadiene-styrene copolymer elastomers are used as a readily recognizable example. This invention can also apply to other high molecular weight synthetic diene rubbers such as those of butadiene, isoprene, and homologues alone or copolymerized with, for example, styrene or its homologues by any of the polymerization methods known to the art that will yield a polymer capable of exhibiting elastomeric properties alone or in combination with such extending oils, said polymers having the characteristics hereinafter set forth.

At present the most common butadiene-styrene copolymer elastomer is that commonly known as GR–S or SBR and is prepared from about three parts of butadiene and one part of styrene by weight. The present invention is applicable to any butadiene-styrene ratio which produces a high molecular weight elastomer which may be "extended" by the addition of large proportions of extending-oil whether such oil be of naphthenic, aromatic, or mixed hydrocarbon nature.

In the process of the present invention the resin may be mixed into the already prepared oil-extended elastomer by any practical mechanical means such as the Banbury, rubber mill, or mixing extruder, e.g., the so-called Plasticator. On the other hand the resin may be dispersed in water by any of the methods gnown to the art and then blended with the elastomer latex along with the desired extending-oil in emulsion form, prior to coagulation by the usual methods. By another method, the extending-oil and resin may first be blended, preferably with some heating to speed the operation; the blend dispersed in water; and this water dispersion blended with the elastomer latex prior to coagulation.

One of the last two, i.e., the latex-dispersion blending processes, is to be preferred over mechanical methods for reasons of optimum dispersion, greater product uniformity, and lower cost of operation. Moreover, these are the only practical methods of compounding the higher molecular weight SBR elastomers which tend to tear or disintegrate in mechanical mills.

If desired, water dispersions of carbon black, clays, antioxidants, or other desired materials may be blended into the elastomer-resin-oil-water dispersed blend prior to coagulation without interfering with the purpose of this invention. It is contemplated that such commonly used rubber components may be used in the amounts and for the purposes for which they are intended.

After coagulation and drying by any method acceptable in the art, these so-called latex masterbatches or water dispersion blends may be further dry compounded on a rubber mill, in a Banbury, or by other mechanical mixer, as desired.

In a broad embodiment, the invention comprises a method (and the resulting composition) for inhibiting or preventing "bleeding" of oil or oil and other ingredients, from oil masterbatch high molecular weight elastomeric polymers with which the invention is concerned, for example, styrene-butadiene elastomeric copolymers. The oil masterbatch comprises polymers having Mooney viscosities (raw) in excess of about 60 (M.L. 100° C./4'), and hydrocarbon oils, for example, petroleum oils, at least about 90% of which boil above 250° C., the oil being present in the proportions of at least about 35 phr. (parts per hundred parts of rubber hydrocarbon), said masterbatch in the cured or uncured state being subject to "bleeding" of oil or oil and other components. In the oil masterbatch is included a synthetic thermoplastic resin comprising relatively low molecular weight, normally solid hydrocarbon resins having a molecular weight of about 300 to about 3,000, the monomeric units of which are predominantly cyclic hydrocarbons, prepared by the thermal or catalytic polymerization of fractions resulting from cracking hydrocarbon gases or oils, said hydrocarbon resins having a softening point of at least 10° C., said hydrocarbon resin being present in an amount at least sufficient to suppress bleeding or migrating of oil, or oil and other components, from the compound, the presently preferred proportions of said resin being up to about 25 phr., although larger proportions of resin to rubber may be used (e.g., 100 phr.), particularly in the case of mechanical goods.

The composition may contain the usual additives employed in compounded rubbers. These will vary depending in part upon the end use and in part upon the character of the elastomer, the extender oil, and the resin employed. These include fillers, pigments, vulcanizing or curing agents, accelerators, antioxidants, etc.

The elastomer may be made by known methods for producing the high molecular weight elastomers with which this invention is concerned. The usual method for producing the higher molecular weight SBR at present involves low temperature (e.g., 41° F.) catalytic copolymerization of butadiene and styrene in the ratios of approximately 2:1 to 3:1, although this process is applicable to a wider range of monomer ratios, say from 100% diene to 2:1 diene to styrene. The method of making the elastomer is not a part of this invention.

The oils used in the oil masterbatch are those which are currently used or have been proposed for use in the high oil-extended, high molecular-weight SBR polymers which have a tendency to bleed or migrate from the polymer particularly when used in proportions of 40–50 phr. or higher. The tendency to bleed becomes greater as larger proportions of oil are used, or as the specific gravity, or the viscosity-gravity constant of the oil decreases. The extender oils usually have viscosity-gravity constants above about 0.79.

The tendency to bleed under oil extension alone constitutes a limiting factor on molecular weight of elastomers which can be used at present. Because of bleeding some of the tougher elastomers generally cannot be used and full advantages of these elastomers cannot be realized. The present invention is designed to overcome this problem.

Since in the range of the present oils the paraffinic compounds are in general waxy, little paraffinic compounds, as such, are normally present in such oils. However, some paraffinic type carbon atoms (not compounds) are present as side-chains attached to aromatic and/or naphthenic rings. These, as would be expected, influence the associated chemical and physical properties of the oil in the direction of the properties exhibited by paraffins. Oil bleeding from elastomer polymer-extender oil systems is accentuated by high portions of paraffinic side chains. This is further emphasized if the naphthenic rings are increased over the aromatic rings present in the oil.

Although oils of higher portions of paraffinic side chains, and low portions of aromatic rings show less compatibility by their tendency to bleed from a rubber compound, and are more difficult to incorporate into the polymer, they do offer better low temperature flexibility and lighter color.

On the other hand the highly aromatic oils, although more expensive when highly refined, are more compatible, bleed less and process more easily; but introduce less low temperature flexibility and darker color and/or a tendency to darken with time. The greater softening tendencies and hence the proportion of oil and the associated economic savings is limited, since these savings are directly related to the proportion of oil used.

Consequently, for light colored compounds, and for low temperature applications it is desirable to select an oil with a minimum of aromatic content required for compatibility or non-bleeding results, and as much paraffinic side chain structure as possible. Through the use of the resins proposed, the oils with more paraffinic side chains along with naphthenic rings and less aromatic rings can be used successfully. Also a higher loading of the otherwise bleeding oil can be used in the presence of one of these resins.

Those oils tending toward the more aromatic side which can to a great extent be used alone in some proportions without bleeding, can be favorably assisted in compound stability and hardness at higher levels of oil extension through the addition of an appropriate quantity of one or more of these resins. The invention also permits use of proportions of aromatic oils which would result in bleeding if used alone. The exact portions will of course depend on the particular rubber compound and its proposed application.

Extender oils of particular utility are largely composed of naphthenic and alkylated naphthenic hydrocarbons and mixtures of these with some aromatic hydrocarbons.

These may be obtained from high boiling fractions of the socalled naphthenic or mixed base crude oils such as Midcontinent, Louisiana, East Texas, etc., crude oils. They may comprise distillate fractions boiling above about 200° C. Suitable fractions are those at least 90% of which boil above about 250° C. More volatile materials may be lost during or after compounding and curing the rubber. The oil should be free of waxes and asphaltenes for most purposes. It may comprise the raffinate from solvent extraction of topped or reduced crude oils or other high boiling, straight-run petroleum fractions, for example, distillates, the 100% and 90% points of which lie in the range of about 250° C. to 400° C. The solvents may be Duo-Sol (propane and cresylic acids), sulfur dioxide, furfural and others. Wax, if present, may be removed or its proportions reduced by methods well known in the petroleum industry. Under some conditions the presence of limited amounts of paraffin wax may not be objectionable and even may be desirable for ozone protection. Asphaltenes, if present, may be removed by precipitation with a low boiling paraffin such as propane, butane or pentane. For many purposes the fraction, if sufficiently non-volatile, can be used with no refining treatment. The oils should be "non-volatile," i.e., should vaporize very slowly if at all under conditions encountered in compounding, curing and use.

The extender oil does not in and of itself constitute a part of the invention. These extenders have been used with both normal and high molecular weight SBR for the purpose of increasing the bulk of the rubber and reducing its cost. Up until recently the principal use has been in normal SBR rubbers, having Mooney viscosities of about 50 or below and the proportions of oil have been of the order of 25 phr. or less.

These oils are not considered in the rubber softening or plasticizing sense of World War II synthetic rubber compounding days when 10 to 20 phr. was generally considered high. Rather they are used at much higher levels and for different purposes. Loadings of 37.5 phr. of oils have been used for some time. Currently levels of 50 phr. of oil are being introduced commercially. Even higher loadings are possible. The following statement in Ind. & Eng. Chem., 45, 1053 (May 1953), may give some idea of the earlier purposes, and meaning of extender-oils:

"The oil extended products utilize a high Mooney viscosity cold GR–S to which is added a cheap petroleum oil in quantities sufficient to soften the rubber to extend it so that the final viscosity of the extended stock is within the usable range . . . which (i.e., the extended rubber) is treated in subsequent processing, compounding and curing operations as if it were 100% rubber hydrocarbon."

In general, plasticizers or softeners used in compounding straight GR–S, as for example, GR–S 1006 (a non-staining, hot polymerized butadiene-styrene copolymer rubber containing a nominal bound styrene content of 23.5%) would be used at a much lower level, possibly at 5 to 10 phr., than the more modern extender-oil in oil-extended SBR of more recent development. The principal reason for this is the difference in molecular weight of the base polymer as indicated by Mooney viscosity, dilute solution viscosity, or ease of processing. GR–S 1006 can be readily processed, i.e., milled or banded, on standard commercial rubber equipment, without the need for any plasticizer or softener.

This is not true in the case of the much higher molecular weight low temperature (41° F.) polymerized SBR polymers used for preparing the oil-extended synthetic rubbers such as Plioflex 1713 or 1714c. "Plioflex 1713 and 1714c are SBR–1713 and SBR–1714c, respectively. That is, they are general purpose, cold polymerized (43° F.) synthetic butadiene-styrene copolymer rubbers possessing a nominal bound styrene content of 23.5%, extended with 50 parts per hundred of a naphthenic oil and of a highly aromatic oil, respectively. An attempt to mill such a polymer without oil-extension would result in tearing and crumbling of the polymer. Such a polymer would have to be degraded in molecular weight to somewhere near the molecular weight of GR–S 1006 before it could be banded on the mill. This would destroy the advantages in properties, in production volume per unit of equipment, and in economies that the higher molecular weight polymer combined with oil-extension offers.

We propose to stabilize and extend these higher molecular weight polymer-extender-oil blends through the addition of specific types of hydrocarbon resins, and particularly of polymerized hydrocarbon resins having a ball and ring softening point between about 100° and 115° C. and a molecular weight of from about 300 to about 3,000, the central monomeric units of which resins are predominantly cyclic hydrocarbons. As indicated elsewhere herein, the resin may be conveniently used in a proportion of from about 5 to 100, or preferably 5 to about 25, parts of resin per 100 parts of rubber. This three-way combination allows the use: (1) of a wider range of extender-oils in that the border lines of oil bleeding from the polymer-oil mixture are expanded to include otherwise less compatible extender-oils by decreasing the tendency of the polymer-extender-oil-resin mixture to separate; (2) of a yet higher molecular weight, much tougher (higher Mooney viscosity) base polymers than practical at present oil-extended levels, i.e., 50 phr. of extender-oil, through the use of these more stable polymer-oil-resin combinations; and (3) of greater volume extension of current base polymers recently introduced in the 50 phr. oil-extended commercial products through the use of 50 phr. or more, of extender-oil plus various amounts of stabilizing and further extending resin.

All of these decrease the cost of the final product which can be considered as the total rubber hydrocarbon content in compounding and increase the volume and weight of the "rubber" produced by existing equipment.

Obviously, the higher the molecular weight of the base polymer, as judged by increased viscosity, the greater the amount of extender-oil required to bring it down to the commercially processible range.

The introduction of one of our hydrocarbon resins in addition to the oil will permit an increase in the amount of oil that can be added before bleeding occurs. If one of the resins having a softening point appreciably above room temperature is used, less softening effect will be found at a given oil level, or more oil can be added to produce the desired softness. At the same time the total rubber volume or weight is thus further extended by the amount of resin used. Such a system applied to still higher molecular weight base polymers allows even further extension with oil and resin, with the accompanying overall greater savings in costs. In any case the presence of the resin produces a more stable system.

The following are examples illustrating the invention. The rubber base compound was prepared using Plioflex 1713X–F, a non-staining, non-discoloring, cold butadiene-styrene copolymer rubber extended with 50 phr. of a naphthenic type oil having a viscosity-gravity constant of about 0.803 and refractivity intercept of 1.045.

The 10% boiling point of the oil was 270° C. and the 90% point 393° C. (ASTM D–850). It had a specific gravity of about 0.874, a Gardner color of 8+, and an aniline point of 115° C. The refractive index at 20° C. was 1.4818. The unsulfonated residue in fuming sulfuric acid (20% $SO_3$) was less than 1% by volume.

BASE COMPOUND

| | Parts/wt. |
|---|---|
| Plioflex 1713X–F | 100 |
| Stearic acid | 2 |
| Zinc oxide | 3 |
| AgeRite HP (a blend of about 65 parts of phenyl-beta-naphthylamide and about 35 parts of diphenyl-p-phenylenediamine) | 1 |
| Philblack O (a high abrasion furnace black) | 50 |
| Sulfur | 2 |
| Amax (N - oxydiethylene benzothiazole - 2 - sulfenamide) | 1.25 |
| Altax (benzothiazyl disulfide) | 0.25 |
| Resin | 0, 5, 10, or 20 |

These components were mixed on a rubber mill and then press cured at 310° F. for 20 minutes. The compound containing no resin was, of course, the control. The resins used at the 5, 10, or 20 parts per hundred of rubber hydrocarbon were:

(1) A naphtenic-aromatic hydrocarbon resin of 101° C. B. & R. softening point obtained by the catalytic polymerization of selected liquid streams resulting from the cracking of hydrocarbon oils or gases.

(2) A naphthenic-aromatic hydrocarbon resin of 115° C. B. & R. softening point obtained by the heat and pressure polymerization of selected streams resulting from the cracking of hydrocarbon oils or gases. These by-product streams are in general considered more aromatic in nature than those used under No. 2 above.

(3) A hydrocarbon resin obtained by catalytic reaction of a mixture of monomers composed essentially of linear dienes and reactive olefins, having an average molecular weight of about 90, to produce a hard solid resin with a resulting average molecular weight approximating 1100 and about 100° C. B. & R. softening point. This resin appears to be methylated paraffin chains containing only a limited amount of unsaturation.

The hydrocarbon fractions from which the resins used in this invention are prepared comprise highly unsaturated normally liquid fractions obtained from high temperature and low pressure pyrolysis of normally-liquid or gaseous hydrocarbons having two or more carbon atoms per molecule. The cracking operation may be carried out with or without steam being present. These fractions may be byproducts pyrolytic processes in which the principal products sought are low boiling olefins and dienes such as ethylene, propylene, butenes, butadiene, etc., which are widely used base hydrocarbons in the petrochemical and plastics fields including elastomers. The pyrolysis of both liquid and gaseous hydrocarbons for such purposes is well known and need not be described in detail. For example, United States Patent 2,836,581 sets forth operating conditions for cracking normally gaseous hydrocarbons to produce olefins and a liquid fraction referred to as "dripolene." Similar conditions of temperature, pressure and time are applicable to cracking liquid hydrocarbons such as natural gasoline, straight run and cracked fractions boiling in the gasoline, naphtha, kerosene and gas oil ranges. Steam may be injected into the cracking zone.

The said patent describes separation of the dripolene into a higher boiling fraction which may be polymerized by heat and pressure to a light colored resin having a softening point of about 100° C. The fraction thus polymerized and the conditions of heat and pressure polymerization disclosed in the patent are typical of the charging stock and polymerization procedure which may be used to make the resins used in my invntion.

In general, the fraction for polymerization boils within the range of about 100° C. (5% point) to about 235° C. (90% point). The fraction may contain from 20% to 80% or more components which are convertible to resins useful in this invention.

Instead of heat and pressure polymerization, catalytic polymerization using a Friedel-Crafts type catalyst may be used, e.g., $BF_3$, complexes of $BF_3$ with ether, low-boiling fatty acids, phenols and the like, aluminum chloride, etc. are suitable. A combination of heat polymerization followed by catalytic treatment such as disclosed in the above patent may be used.

In addition to polymerization and copolymerization alkylation reactions may also occur, particularly when the catalytic reaction is employed. The term "polymerization" is intended to embrace this or other reactions taking place when the resin is made. The resulting product after separation of unreacted components of the charge (e.g., by steam or vacuum distillation) is largely naphthenic-aromatic in nature. In other words it may be considered as a resin in which the basic monomeric units are largely cyclic hydrocarbons.

The polymerization reaction is usually carried out in the presence of an inert diluent such as xylene, toluene, etc., to keep the resultant resin in solution until the reaction is complete. The diluent and unreacted components are removed after the reaction is completed.

These three resins gave the results shown in Table I in (A) the oil-extended rubber with resin alone, and (B) in the cured compound. The cured, unaged compound was tested by contact with a cigarette paper under 2 p.s.i. pressure at room temperature. The cured and aged compound was tested by finger contact.

*Table I.—Oil staining*

| Control | Resin No. 1, PHR [1] | | | Resin No. 2, PHR [1] | | | Resin No. 3, PHR [1] | | |
|---|---|---|---|---|---|---|---|---|---|
| | 5 | 10 | 20 | 5 | 10 | 20 | 5 | 10 | 20 |
| (A) Medium Stain | Faint | Little or none. | V. Sl. if any. | Sl | Some | Little or none. | Strong stain | Strong stain | No Test. |
| (B) I Unaged: 30% Def | 60% Def | 50% Def | 20% Sl | 60% Sl | 50% V. Sl | 40% V. Sl | 90 Strong | 80% Strong | 90%. Strong. |
| (B) II Aged: [2] Slight | None | None | None | None | None | None | Very much | Extreme | Extreme. |

[1] PHR.=Parts per hundred of rubber.
[2] Oven aged 2 weeks at 70° C. The aged samples were inspected for surface oil by finger contact instead of weighted cigarette paper.
(A)=Unvulcanized oil-extended rubber plus resin.
(B)=Vulcanized rubber compound.
"Def."=Definite stain, percent of area of test paper stained.
Sl.=Slight stain.   V. Sl.=Very slight stain.

These tests showed that compounds containing Resin No. 3 showed bleeding of an oily material on the surface under all conditions tested and very soon after mixing. It has actually been shown that Resin No. 3 creates or very greatly intensifies oil bleeding characteristics where little or none originally appeared. Consequently, that type of resin is not useful in such compounds.

Resins Nos. 1 and 2 are the preferred resins for retaining the oil in oil-extended SBR compounds. They show less oil bleeding as the amount of resin is increased. By using Resin No. 1 or No. 2 the oil-extension of the high molecular weight SBR polymer can be successfully carried to higher proportions than 50 phr. of extender oil. This would increase economic savings both as a result of the added oil and of the resin used. It also makes it possible to increase the molecular weight of the SBR polymer beyond that commercially practical at present and still retain processability due to the higher plasticizing effects at the higher oil and resin loadings without major changes in the processing equipment now in use.

The use of Resin No. 1 or No. 2 in compounding these oil-extended SBR polymers offers another opportunity for savings through the higher loadings of low cost fillers that can be used at a desired compound hardness.

In view of their lower oil absorbing properties, compounds containing mineral fillers may enjoy an increased advantage in bleeding control through the use of these resins. Tighter cures without bleeding can also be used in the presence of these resins.

*Mixing or masterbatching.*—It has been shown that above resins can be blended into the butadiene-styrene elastomer either by mechanical mixing by any known method of the dry oil-extended polymer with the resin; or by dispersing the resin in water and blending the resin dispersion along with the extending-oil emulsion into the butadiene-styrene elastomer latex as it comes from the polymerizers; or by hot-melt blending of the extending-oil and resin prior to dispersing the combination in water and subsequently blending the extending-oil-resin dispersion with the butadiene-styrene elastomer latex as it comes from the polymerizer and prior to coagulation and drying.

The latex mixing systems are much to be preferred because of the shorter time required, the more intimate mixtures obtained, the greater product uniformity, and the appreciably lower cost of the latex mixing operation over the high power consumption and high cost machinery required for mechanical blending. Further, the latex blending procedure will result in much less degradation of the higher molecular weight butadiene-styrene copolymers. The importance of preventing the copolymer degradation under mechanical mastication increases as the molecular weight of the butadiene-styrene copolymer selected increases.

The following are examples of the dispersion used in latex blending.

DISPERSION NO. 1

| | Parts by wt. |
|---|---|
| Resin | 100 |
| Sodium soap of Acintol D | 5 |
| Distilled water | 145 |

Dispersed at room temperature.

DISPERSION NO. 2.—IN SITU METHOD

| | Parts by wt. |
|---|---|
| Part A: | |
| Resin | 100 |
| Acintol D * | 4.38 |
| Part B: | |
| Sodium hydroxide | 0.62 |
| Distilled water | 145.00 |

* Acintol D is a product composed of tall oil acids in the ratio of 30% rosin acids and 70% high molecular weight fatty acids.

Part A is hot-melt blended, cooled and ground before dispersing in Part B with strong agitation at room temperature.

DISPERSION NO. 3

| | Parts by wt. |
|---|---|
| Resin | 60 |
| Distilled water | 57.4 |
| Darvan No. 1 * | 2.4 |
| Bentonite | 0.25 |

* Darvan No. 1 is a product described as polymerized sodium salts of alkylnaphthalene sulfonic acids.

The components were ground together at room temperature.

DISPERSION NO. 4.—HOT-MELT

| | Parts by wt. |
|---|---|
| Part A: | |
| Resin | 22.5 |
| Extending-oil | 150.0 |
| Acintol D | 7.56 |
| Part B: | |
| Sodium hydroxide | 1.1 |
| Distilled water | 163.9 |

Part A was hot-melt blended together, cooled to 65 to 75° C., and added to Part B at 65 to 75° C. with good agitation.

DISPERSION NO. 5.—HOT-MELT

| | Parts by wt. |
|---|---|
| Part A: | |
| Resin | 90.0 |
| Extending-oil | 150.0 |
| Acintol D | 10.5 |
| Part B: | |
| Sodium hydroxide | 1.5 |
| Distilled water | 228.0 |

Mixed as in Dispersion No. 4.

The first three examples of dispersions were charged to the butadiene-styrene copolymer latex after the antioxidant dispersion and the extending-oil emulsion had been stirred in as separate operations. The ratios used were those required to give 50 phr. extending-oil and either 5, 10, or 20 phr. of resin as desired in the final coagulate.

In the case of Dispersions 4 and 5, which were the dispersions of hot-melt blends of the extending-oil with the resin, the ratios of extending-oil to resin were preset and the combined dispersion was charged to the required amount of butadiene-styrene latex for 50 phr. oil-extension following the addition of the antioxidant dispersion.

I claim:

1. In the manufacture of improved, non-bleeding vulcanizates from an oil masterbatch high molecular weight elastomeric diene polymer, said oil masterbatch comprising (a) a polymer having a Mooney viscosity in excess of about 60 (M.L. 100° C./4'), and (b) at least 35 parts per 100 parts of polymer of a hydrocarbon extender oil composed predominantly of naphthenic and alkylated naphthenic hydrocarbons at least about 90% of which boil above 250° C., the improvement of incorporating in said oil masterbatch, prior to curing it, a synthetic thermoplastic, relatively low molecular weight hydrocarbon resin, the central monomeric units of which are predominantly cyclic hydrocarbons, said resin being prepared by polymerization of an unsaturated fraction boiling within the range of about 100° C. to about 235° C,. containing at least about 20% of polymerizable components and resulting from cracking of hydrocarbon oils and gases, said resin having a ball and ring softening point between about 100° and 115° C. and having a molecular weight of about 300 to about 3000.

2. The method of claim 1 wherein the elastomeric polymer is a styrene-butadiene copolymer.

3. The method of claim 1 wherein the resin is added in a proportion of from about 5 up to about 25 parts per 100 parts of rubber.

4. The method of claim 1 wherein the elastomeric polymer is polyisoprene.

5. The method of claim 1 wherein the elastomeric polymer is polychloroprene.

6. The method of claim 1 wherein the elastomeric polymer is polybutadiene.

7. A cured rubbery composition comprising an oil masterbatch high molecular weight elastomeric diene polymer, said oil masterbatch comprising a polymer having a Mooney viscosity in excess of 60 (M.L. 100° C./4'), at least about 35 parts per 100 parts of polymer of a hydrocarbon extender oil composed predominantly of naphthenic and alkylated naphthenic hydrocarbons, at least about 90% by volume of said extender oil boiling above about 250° C., and at least 5 parts per hundred parts of polymer of a synthetic thermoplastic resin comprising relatively low molecular weight hydrocarbon resin, the central monomeric units of which are predominantly cyclic hydrocarbons, said resin being prepared by polymerization of an unsaturated fraction boiling within the range of about 100° C. to about 235° C., containing at least about 20% of polymerizable components and resulting from cracking of hydrocarbon oils and gases, said hydrocarbon resin having a ball and ring softening point between about 100° and 115° C. and having a molecular weight of about 300 to about 3000.

8. The composition of claim 7 wherein the elastomeric polymer is a styrene-butadiene copolymer.

9. The composition of claim 7 wherein the resin of group 2 is added in a proportion of up to about 25 parts per 100 parts of polymer.

10. The composition of claim 7 wherein the elastomeric polymer is polyisoprene.

11. The composition of claim 7 wherein the elastomeric polymer is polychloroprene.

12. The composition of claim 7 wherein the elastomeric polymer is polybutadiene.

13. The process of claim 1 wherein the hydrocarbon resin is prepared by thermal polymerization.

14. The process of claim 1 wherein the resin is prepared by catalytic polymerization.

15. The composition of claim 7 wherein the hydrocarbon resin is prepared by thermal polymerization.

16. The composition of claim 7 wherein the resin is prepared by catalytic polymerization.

References Cited by the Examiner

UNITED STATES PATENTS

| | | | |
|---|---|---|---|
| 2,415,541 | 2/47 | Soday | 260—33.6 |
| 2,421,627 | 6/47 | La Crosse | 260—45.5 |
| 2,836,581 | 5/58 | Gordon | 260—33.6 |
| 2,993,023 | 7/61 | Pfau et al. | 260—33.6 |

OTHER REFERENCES

Earley et al., "Mechanical Properties of High Mooney Elastomers," Rubber Age, April 1954, pages 65–72.

MORRIS LIEBMAN, *Primary Examiner.*

LEON J. BERCOVITZ, *Examiner.*